Feb. 26, 1929.

L. I. VE VERKA 1,703,801

EMERGENCY CHECK VALVE

Filed June 4, 1927

3 Sheets-Sheet 1

INVENTOR
LEWIS I. VEVERKA

Feb. 26, 1929.

L. I. VE VERKA 1,703,801

EMERGENCY CHECK VALVE

Filed June 4, 1927

3 Sheets-Sheet 3

WITNESSES

INVENTOR
LEWIS I. VEVERKA
BY
ATTORNEYS

Patented Feb. 26, 1929.

1,703,801

UNITED STATES PATENT OFFICE.

LEWIS I. VE VERKA, OF SAN MARCIAL, NEW MEXICO.

EMERGENCY CHECK VALVE.

Application filed June 4, 1927. Serial No. 196,519.

This invention relates to an emergency check valve for turrets in locomotives.

An object of the invention is the provision of a device for causing automatic closing of a valve in the main turret of a locomotive to be closed at the time of a wreck or collision to prevent steam escaping from broken pipes inside of the cab in order to protect the engine crew from scalding.
Another object of the invention is the provision of a means for permitting automatic closing of a valve in the main turret or fountain of a locomotive when during an accident the cab is shifted, and in which a rod which normally maintains the said valve open will be shifted to release the valve which is then automatically closed by steam pressure in the turret.

A further object of the invention is the provision of an emergency valve in a turret or fountain of a locomotive which will permit the passage of steam to the various pipes supplying pressure for the various control elements associated with the locomotive and in which the valve is maintained in open position by a rod of restricted diameter which is capable of being shifted or displaced from the valve stem to permit the steam in the turret normally acting on the piston associated with the stem to cause closing of the valve and to prevent the escape of steam through any of the pipes which have been fractured during the collision and thus prevent injury to the engine crew.
A still further object of the invention is the provision of an emergency valve in a turret or fountain of a locomtive and in which the valve is normally maintained in open position to supply steam for the various agencies which are effective in the control of the train, said valve being held in an open position by a rod capable of being shifted during an accident to the cab whereby said valve is released through the pressure of the steam in the turret for closing, provision being made for counterbalancing the steam pressure from the boiler against one side of the valve whereby said valve may be readily opened when desired.
This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expresed in the appended claims.

Figure 1:
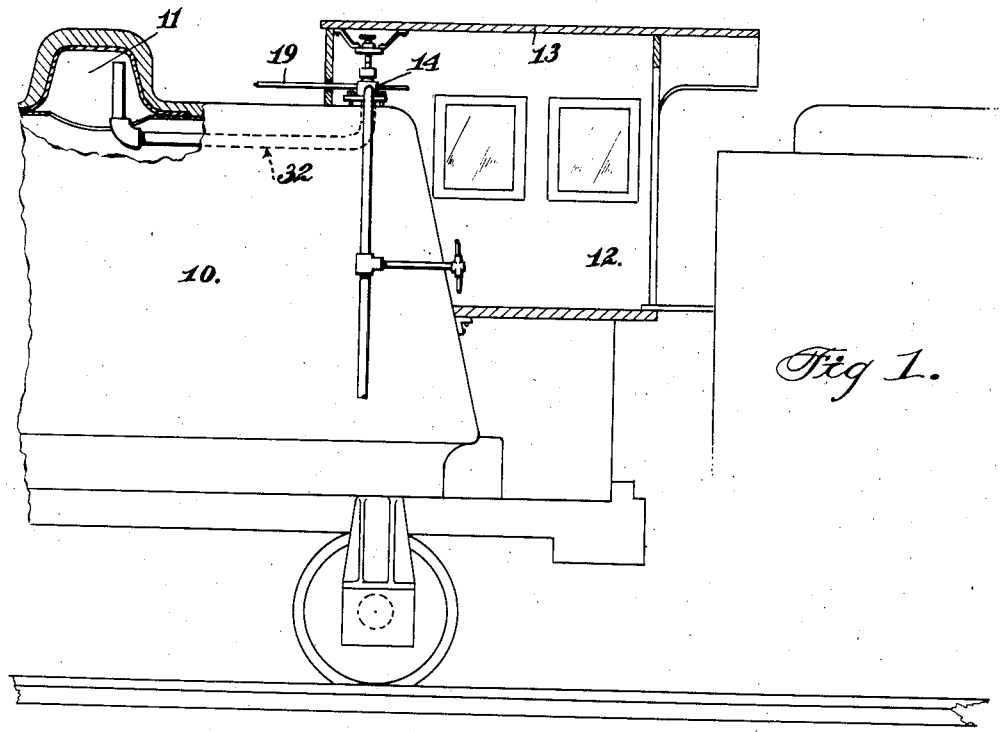
Figure 2:
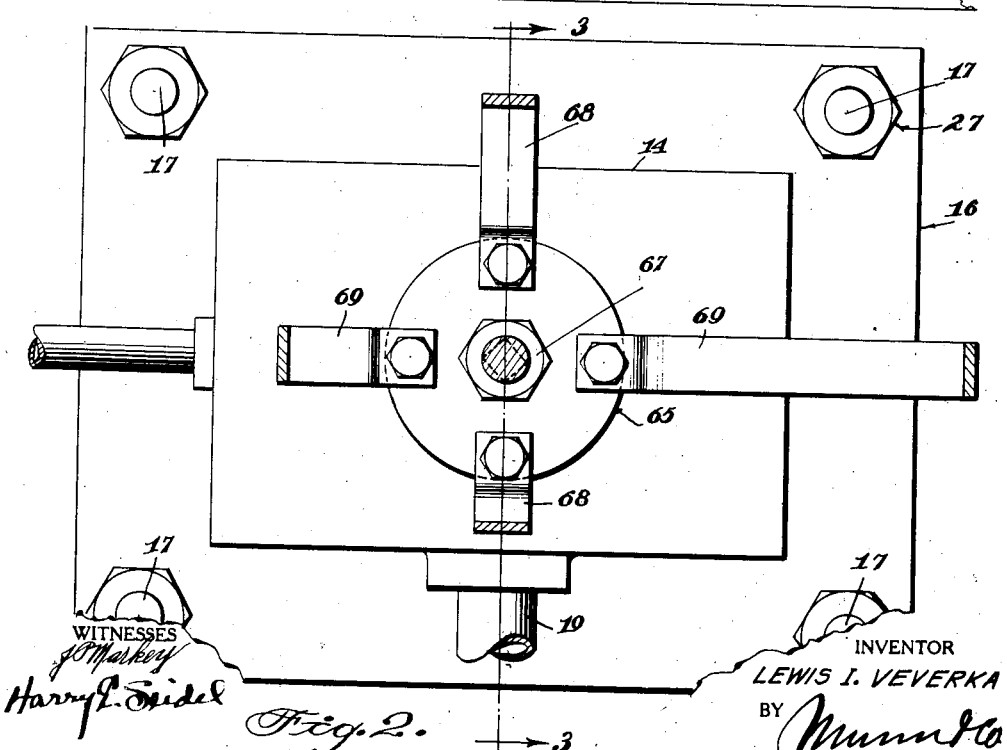
Figure 3:
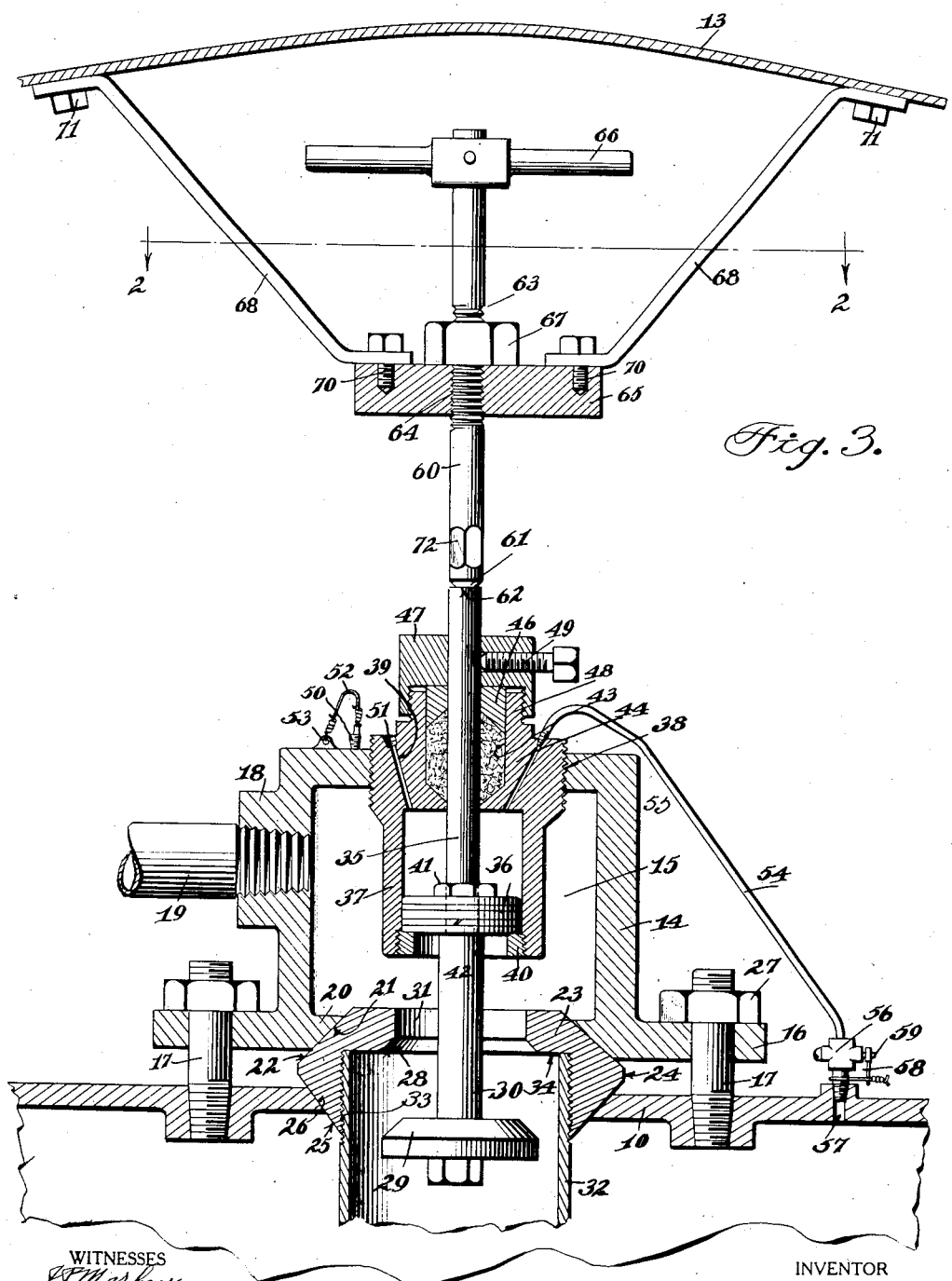
Figure 4:
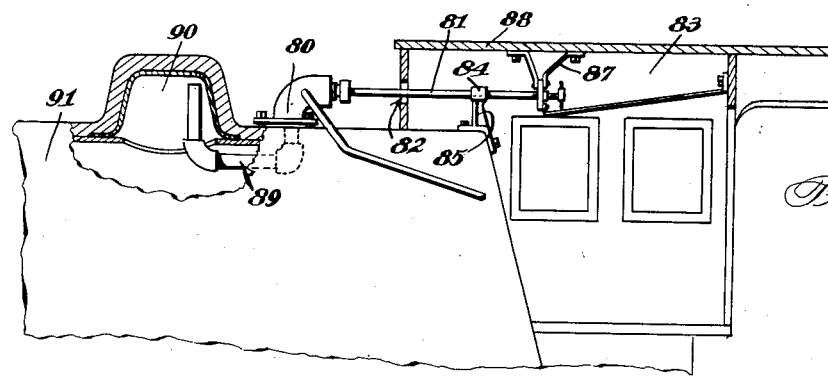
Figure 5:
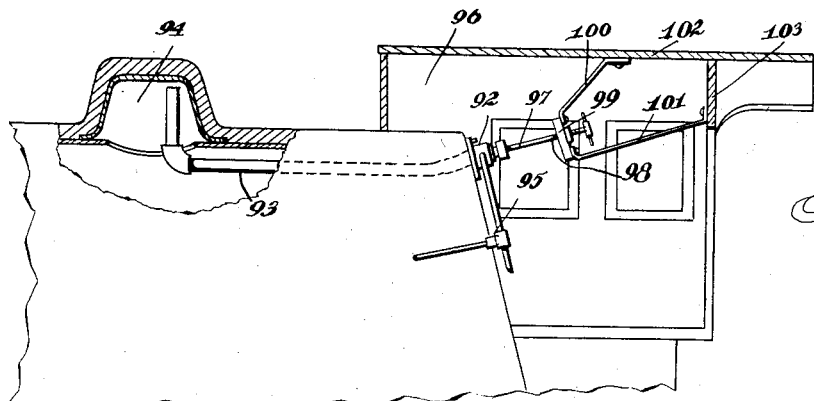
Figure 6:
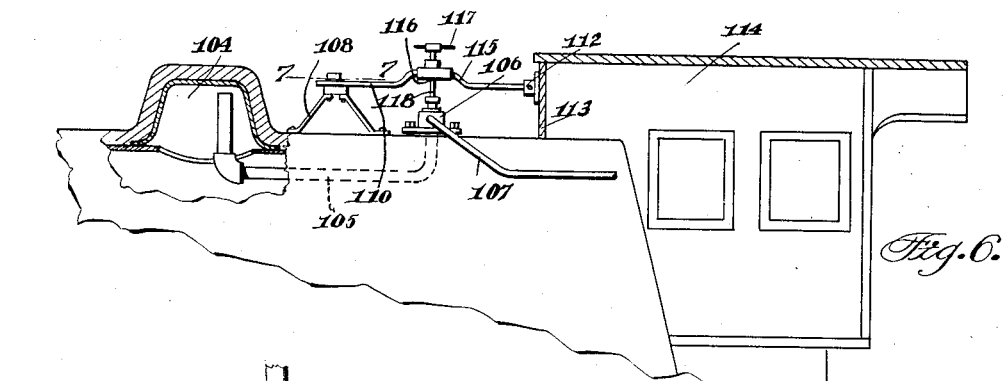
Figure 7:
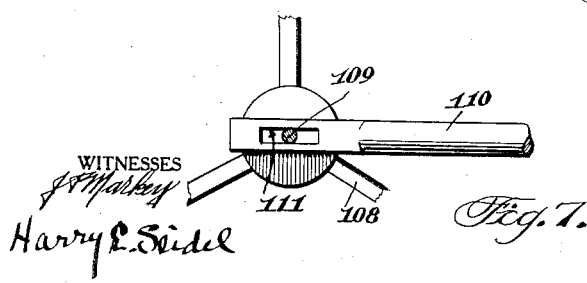

Figure 1 is a fragmentary side view of a locomotive and cab partly in section showing my invention applied thereto, Figure 2 is a horizontal section taken along the line 2—2 of Fig. 3, Figure 3 is a vertical section taken along the line 3—3 of Fig. 2, Figure 4 is a fragmentary side view of a locomotive and cab partly in section showing a modified form of the invention, Figure 5 is a fragmentary side view of the locomotive and cab partly in section disclosing the application of the invention to a different type of locomotive, Figure 6 is a fragmentary side view partly in section of another form of locomotive showing the application of my invention thereto, and Figure 7 is a horizontal section taken along the line 7—7 of Fig. 6.

Referring more particularly to the drawings 10 designates a locomotive boiler having a dry steam chamber 11 and a cab 12 for the engine crew. The cab is equipped with a roof 13 below which is mounted on the boiler 10 a turret or fountain 14.

The turret or fountain has a chamber 15 and a flange 16 of the turret is bolted at 17 to the boiler 10. The turret is provided with a plurality of internally threaded bosses 18 in which are adapted to be screwed pipes as indicated at 19 which are directed to various parts of the locomotive or train and through which steam is supplied from the chamber 15 for actuating mechanisms or controls forming part of the usual equipment of the train. While I have shown but one pipe 19 connected with the turret, it will be appreciated that any number of pipes are employed which may be necessary.

A bottom 20 of the turret is provided with an opening 21 which has tapered walls to receive the tapered end 22 of a floating collar 23. From the portion 24 of the valve seat, which has the greatest diameter, the member 23 tapers downwardly as shown at 25, and is received within a tapered opening 26 in the top of the boiler 10. When the nuts 27 are screwed up tight on the bolts 17, the member 23 will be rigidly secured in place and form a seal at the openings 21 and 26 to prevent the escape of steam at these points.

The body member 23 has a valve seat at 28 to receive a valve 29 carried by a stem 30. Above the valve seat, the port 31 is provided which places one end of a pipe 32 in communication with the chamber 15. This pipe is threaded into an enlarged threaded passage 33 of the body member 23 and the upper end of the pipe abuts a shoulder 34 in the body member 23. Said body member in effect in the form of a hollow plug not only closes the opening in the lower end of the chamber 15 but also the opening in the top of the boiler 10 and provides for the passage of the steam to the chamber 15. The pipe 32, as shown more particularly in Fig. 1 connects the dry steam chamber 11 of the boiler with the chamber 15 of the turret.

A stem 30 is reduced at 35 and forms a piston rod for a piston 36 mounted for reciprocation in a cylinder 37 which is screwed at 38 into an opening in the top of the turret and is normally in communication with the atmosphere by means of a restricted passage 39. The lower end of the cylinder is threaded to receive a nut or collar 40 which is adapted to normally support the piston when the valve is in open position. A nut 41 locks the piston 36 to a shoulder 42 in the stem 30.

The head 44 of the cylinder 37 has a pocket 43 in which packing material 45 is located and held in place by a gland 46. This gland is maintained in position by means of a cap nut 47 threaded through the outer reduced upper end 48 of the head 44. A set screw 49 in the cap nut 47 is adapted to engage the rod 35 and secure the same against movement, as will be presently explained.

A threaded plug 50 is adapted to be screwed into a threaded socket 51 at the outer end of the passage 39 for closing said passage when desired. Any suitable means as shown at 52 which may be a wire chain or string, connects the plug 50 with the perforated lug 53 on the top of the turret 15 so that the plug will be in a convenient position for replacement in the threaded socket 51.

A pipe 54 which is of restricted diameter is connected at one end with a passage 55 and at the other end with a valve casing 56 which is in communication with the boiler 10 through a port 57. A valve handle 58 is connected with the valve stem 59 and is adapted to control the opening and closing of the valve in the casing 56. The handle 58 normally depends from the stem in order to aid in maintaining the valve in closed position.

An operating rod 60 has its lower end, as shown in 61, in engagement with the upper free end 62 of the piston rod 35 which forms an extension in the valve stem 30. Since the rod is held in a predetermined position and against movement, the said rod is adapted to maintain the valve 29 open as long as the lower end of the said rod is in engagement with the upper end of the piston rod 35. The rod 60 is threaded at 63 and is screwed into a threaded passage 64 of a block 65. A handle 66 on the upper end of the rod 60 is provided for causing rotation of the rod and moving said rod in longitudinal alignment with the stem 30 whereby the valve 29 may be opened or closed. A nut 67 on the threaded portion 63 of the rod 60 aids in maintaining the said rod in position. Brackets 68 and 69 are connected to the block 66 by means of bolts 70 and have their upper ends secured at 71 to the top of the cab 13.

The operation of my device is as follows:

Steam from the chamber 11 is conducted by the pipe 32 through the port 31 and into the steam chamber 15 of the turret 14 and this steam is distributed through the pipes to the various instrumentalities which are adapted to be operated or controlled by the steam. As shown in Fig. 1, the turret is located inside of the cab 12 so that in an accident to the locomotive and to the cab, said cab is usually distorted or shifted from its normal position causing breakage of the various pipes represented by the numeral 19 so that live steam will be discharged directly into the cab and onto the engine crew and in which case the engine crew are seriously injured by scalding.

The valve 29 in the usual form is located in the direction opposite to that shown in Fig. 3 so that the valve normally tends to move into the chamber 15 against the pressure of the steam so that the chamber 15 will also be supplied with steam. In this case, however, I have inverted the position of the valve and equipped the valve stem with a piston 36 which is acted upon by the steam in the pipe 32 and in the chamber 15. This steam pressure on the piston and likewise on the valve 29 will tend to close said valve but the rod 60 being held in rigid relation within the block 65 will prevent closing of the valve and maintain the same in the position for the admission of live steam into the chamber 15 at all times except when the cab has been distorted during an accident. The normal escape of steam past the piston 36 passes to the atmosphere through the passage 39 so that the upper or outer face of the piston is subject to atmospheric pressure while the internal face is subjected to the steam pressure, which is considerably high in the boilers of locomotives.

During an accident to the locomotive and when the accident is of sufficient degree to cause rupture of the various pipes conducting steam away from the chamber 15 the cab will have been shifted thereby causing the rod 60 to be displaced relative to the outer free end of the piston rod 35 so that the pressure of the steam on the piston 36 and likewise on the valve 29 will instantly cause said valve to be closed and thus cut off the steam from the boiler to the chamber 15 and likewise to the pipes indicated at 19. It will be appreciated that it is immaterial which way the cab 12 is shifted since the rods 60 will be displaced from the free end of the piston rod 35 so that there will be little or no danger of the valve 29 not closing when the cab has been displaced from its normal position in any direction. If at any time it is desired to close the valve 30 manually it is only necessary to actuate the handle 66 of the rod 60 and rotate the same in the direction to cause said rod to move upwardly and away from the piston rod 35 whereby the steam pressure will be sufficient to cause the valve 29 to close. When it is desired to open the valve the handle bar is actuated causing a reverse rotation of the rod 60 thereby moving the piston rod and valve stem and likewise the valve 29 inwardly. If the conditions be such that it is impossible to reach the handle 66, a tool may be applied to the square portion 72 of the rod 60 whereby the same may be rotated.

In view of the fact that the pressure in the boiler 10 is considerably high, the pressure will be normally such that it will resist the manual opening of the valve 29. For this purpose in order to assist in the manual operation or to equalize the pressure on opposite sides of the valve 29, the valve stem 59 is actuated causing opening of the valve in the casing 56 whereby steam will pass through the port 54 into the upper end of the cylinder 37 and against the opposite face of the piston 36. A plug 50 is screwed into the threaded pocket 51 to prevent escape of steam to the atmosphere. At this time the pressure in effect upon opposite sides of the valve has been approximately equalized and manual opening of the valve 29 will be readily accomplished. It will be appreciated that the pressure is exerted on one face of the piston while pressure is also exerted on a face of the valve which is directed toward the boiler.

If during an accident the rod 60 has been shifted too far from the free end 62 of the piston rod 35 to cause the rod 60 to engage the free end of the piston rod 35 a bar may be applied between the free ends 61 and 62 of the rod 60 and the piston rod 35 for forcing the valve to open position after which the said set screw 49 may be drawn up tight against the piston rod 35 to prevent the valve 29 from closing. The set screw is only employed when the rod 60 is located in an inoperative position.

In the construction shown in Fig. 4, a turret 80 is located in a horizontal position and the piston rod 81 is extended through an opening 82 in the front wall of the cab 83 and is slidably mounted in a bearing 84 of a bracket 85. The outer free end of the piston rod is normally in engagement with the controlling rod 86 which is supported in brackets 87 carried by the top 88 of the cab 83. Distortion of the cab or shifting the cab relative to its normal position will cause the rod 86 to be moved out of engagement with the free end of the piston rod 81 thereby permitting the valve in the turret 80 to be closed as has been previously explained in reference to Figs. 1, 2 and 3 inclusive. A pipe 89 connects the dry steam chamber 90 of the locomotive 91 with the turret 80.

Referring more particularly to Fig. 5, the turret 92 is shown secured to the inner face of the locomotive boiler and the pipe 93 connects the dry steam chamber 94 with the turret for supplying the turret with steam for distribution of the fluid to the various pipes, as indicated at 95 for actuating or controlling the various instrumentalities associated with the train. This turret is located within the cab 96 and the piston rod 97 is normally engaged by the free end of the control rod 98 threaded into a block 99 which is carried by brackets 100 and 101, said brackets being secured to the roof 102 and the rear wall 103 of the cab 96. In this instance any lateral shifting or any forward longitudinal shifting or distortion of the cab 96 will cause the free end of the rod 98 to move out of engagement with the piston rod 96 whereby the piston and valve are free to the action of the steam in the boiler and turret whereby the valve is closed as has been previously explained with reference to Fig. 3.

The invention is shown applied to another form of locomotive as illustrated in Fig. 6 and in which a dry steam chamber 104 is connected by a pipe 105 with the turret 106. Pipe 107 connects the turret with the dry steam chamber for distribution to the various instrumentalities which either are actuated by the steam or which are to be controlled by the steam for producing certain results. A bracket 108 supports a pivot 109 for one end of a lever 110. This lever has a rod, as shown at 111, to receive the pivot 109 and whereby the lever may not only rock on the pivot but may be shifted longitudinally on the pivot. The other end of the lever, as shown at 112 is connected to the front 113 of the cab 114. This lever has a yoke 115 into which is threaded an actuating rod 116 having actuating handles 117 at its outer free end. The inner end of the rod 116 normally rests upon the outer free projecting end of the piston rod 118. This piston rod carries a valve at its lower end in the same manner as shown in Fig. 3, and the rod 116 normally prevents closing of the valve until during a wreck when the cab 114 has been displaced relative to the locomotive, so that the lever 110 will be shifted at that end which is connected to the cab 114 thereby carrying the rod 116 away from the free end of the piston rod 118, so that the steam can force the piston, as shown in Fig. 3, outwardly and cause closing of the valve and thus cut off steam to the turret and prevent injury to the engine crew by scalding when any of the pipes are fractured due to the distortion or shifting in any manner of the cab when the locomotive is in an accident.

It will be appreciated that a spring may be employed in connection with the valve stem for tending to close the valve against the fixed rod and which will force the valve to closed position when the rod is shifted laterally from the free end of the valve stem.

I claim:—

1. In a locomotive, a cab, a steam turret having a valve seat, a valve adapted to engage the valve seat, means for maintaining the valve open and secured to the cab, said means being adapted to be displaced when the cab is displaced relative to the turret for permitting the valve to be automatically closed.

2. In a locomotive, a cab, a steam turret having a valve seat, a valve adapted to engage the valve seat, means for maintaining the valve open and secured to the cab, said means being adapted to be displaced when the cab is displaced relative to the turret for permitting the valve to be automatically closed by steam pressure, said means comprising an adjustably mounted rod.

3. In a locomotive, a cab, a boiler, a steam turret, means for placing the steam turret in communication with the boiler, a valve for controlling the communication, and means for maintaining the valve normally open against the pressure of the steam and fixed to the cab so that dislocation or distortion of the cab, relative to the turret will release the said means to permit automatic closing of the valve.

4. In a locomotive, a cab, a boiler, a steam turret, means for placing the steam turret in communication with the boiler, a valve for controlling the communication, said valve being provided with a stem projecting through the turret, a rod supported by the cab and having one end adapted to engage the free end of the stem for maintaining the valve normally open, said rod being adapted to be displaced relative to the stem when the cab is distorted and displaced relative to the turret.

5. In a locomotive, a cab, a boiler, a steam turret, means for placing the steam turret in communication with the boiler, a valve for controlling the communication, said valve being provided with a stem projecting through the turret, a rod supported by the cab and having one end adapted to engage the free end of the stem for maintaining the valve normally open, said rod being adapted to be displaced relative to the stem when the cab is distorted and displaced relative to the turret and means acted upon by boiler pressure for aiding in closing the valve.

6. In a locomotive, a cab, a boiler, a steam turret, means for placing the steam turret in communication with the boiler, a valve for controlling the communication, said valve being provided with a stem projecting through the turret, a rod supported by the cab and having one end adapted to engage the free end of the stem for maintaining the valve normally open, said rod being adapted to be displaced relative to the stem when the cab is distorted and displaced, and means adapted to be moved for aiding in closing the valve, a pipe connecting the boiler with the steam turret for counteracting the effect of the means tending to close the valve whereby said valve may be readily released.

7. In a locomotive, a cab, a boiler, a steam turret, means for placing the steam turret in communication with the boiler, a valve for controlling the communication, said valve being provided with a stem projecting through the turret, a rod supported by the cab and having one end adapted to engage the free end of the stem for maintaining the valve normally open, said rod being adapted to be displaced relative to the stem when the cab is distorted and displaced, a cylinder in the turret, a piston in said cylinder and connected with the valve stem and adapted to be acted on by the steam in the turret and tending to close the valve.

8. In a locomotive, a cab, a boiler, a steam turret, means for placing the steam turret in communication with the boiler, a valve for controlling the communication, said valve being provided with a stem projecting through the turret, a rod supported by the cab and having one end adapted to engage the free end of the stem for maintaining the valve normally open, said rod being adapted to be displaced relative to the stem when the cap is distorted and displaced, a cylinder in the turret, a piston in said cylinder and connected with the valve stem and adapted to be acted on by the steam in the turret and tending to close the valve, a valved pipe connecting the boiler with the steam turret on that side of the piston which is opposite to that of the valve and adapted when desired to supply steam to the turret tending to force the valve in open position.

9. In a locomotive, a cab, a boiler, a steam turret, means for placing the steam turret in communication with the boiler, a valve for controlling the communication, said valve being provided with a stem projecting through the turret, a rod supported by the cab and having one end adapted to engage the free end of the stem for maintaining the valve normally open, said rod being adapted to be displaced relative to the stem when the cab is distorted and displaced, a cylinder in the turret, a piston in said cylinder and connected with the valve stem and adapted to be acted on by the steam in the turret and tending to close the valve, said cylinder being in restricted communication with the atmosphere, and means for closing the said restricted communication when desired.

10. In a locomotive, a cab, a pin fixed against lateral movement and secured to the cab, a steam turret, a boiler, means for placing the boiler in communication with the turret, a valve for controlling the communication and provided with a stem adapted to align with the free ends of the pin for maintaining said valve in open position, said pin being adapted to be released from the stem when the cab is displaced relative to the turret.

LEWIS I. VE VERKA.